United States Patent

Zeilinger et al.

[11] Patent Number: 5,857,161
[45] Date of Patent: Jan. 5, 1999

[54] SYSTEM FOR DETERMINING A GEAR RATIO CHANGE IN AN AUTOMATIC TRANSMISSION

[75] Inventors: Bernhard Zeilinger, Vaihingen; Chi-Thuan Cao, Korntal-Münchingen; Marko Poljansek, Reutlingen, all of Germany

[73] Assignee: Robert Bosch GmbH, Stuttgart, Germany

[21] Appl. No.: 677,742

[22] Filed: Jul. 8, 1996

[30] Foreign Application Priority Data

Jul. 8, 1995 [DE] Germany .......... 195 24 914.3

[51] Int. Cl.$^6$ .......... F16H 59/18; B60K 41/06
[52] U.S. Cl. .......... 701/51; 701/57; 701/58; 701/65; 477/43; 477/46
[58] Field of Search .......... 701/51, 55, 57, 701/58, 61, 65; 477/43, 46, 78, 135, 144

[56] References Cited

U.S. PATENT DOCUMENTS

| | | | |
|---|---|---|---|
| 4,841,815 | 6/1989 | Takahashi | 701/51 |
| 5,025,684 | 6/1991 | Stehle et al. . | |
| 5,079,705 | 1/1992 | Sakai et al. . | |
| 5,157,609 | 10/1992 | Stehle et al. . | |
| 5,323,318 | 6/1994 | Hasegawa et al. . | |
| 5,343,783 | 9/1994 | Tanaka et al. . | |
| 5,389,050 | 2/1995 | Sakai et al. | 701/57 |
| 5,544,053 | 8/1996 | Nakashima | 701/57 |
| 5,555,170 | 9/1996 | Nakashima | 701/57 |
| 5,557,521 | 9/1996 | Danz et al. | 477/53 |

FOREIGN PATENT DOCUMENTS

| | | |
|---|---|---|
| 0433603 | 6/1991 | European Pat. Off. . |
| 0471102 | 2/1992 | European Pat. Off. . |
| 0576703 | 1/1994 | European Pat. Off. . |
| 2714559 | 10/1978 | Germany . |
| 2811574 | 9/1979 | Germany . |
| 3144845 | 12/1982 | Germany . |
| 4120603 | 1/1993 | Germany . |
| 4328274 | 3/1994 | Germany . |
| 4419753 | 4/1995 | Germany . |

OTHER PUBLICATIONS

"ATZ", Automobiltechnische Zeitschrift 92 (1992) 9, pp. 428 to 436 (month is not available).
"ATZ", Automobiltechnische Zeitschrift 95 (1993) 9, pp. 420 to 434 (month is not available).
"Fuzzy Logic in Control Systems: Fuzzy Logic Controller–Part I and Part II" by C. C. Lee, IEEE Transactions on Systems, Man and Cybernetics, vol. 20, No. 2, 1990, pp. 404 to 435 (Mar. 1990).
"TILshell User's Manual", p. 295, Togai Infralogic, Inc. California, U.S.A. 1988 to 1993. Version 3.0.0.
"Steuerungsmöglichkeiten im Antrieb von Fahrzeugen" by H.-J. Burger, Fortschritt–Berichte der VDI–Zeitschriften, Series 12, Nr. 49, 1984 (month is not available).

*Primary Examiner*—Tan Q. Nguyen
*Attorney, Agent, or Firm*—Walter Ottesen

[57] ABSTRACT

The invention is directed to a system for determining gear ratio change in an automatic transmission in a vehicle having an accelerator pedal actuated by a driver of the vehicle. The system includes a first sensor for detecting the position (DK) of the accelerator pedal as a first variable and a second sensor for detecting the straight-line speed ($V_x$) of the vehicle as a second variable. An adaptation variable (BZ) is determined in dependence upon at least one of the following: the instantaneous driving behavior of the driver, the environmental conditions to which the vehicle is subjected and the driving situation in which the vehicle is. A gear ratio change function includes a characteristic field for receiving the first and second variables (DK, $V_x$) as first and second input variables (DK, $V_x$), respectively. At least one of the first and second input variables (DK, $V_x$) is changed in dependence upon the adaptation variable (BZ). The characteristic field is used to determine the gear ratio change in dependence upon said adaptation variable (BZ).

11 Claims, 7 Drawing Sheets

| | DKI / DKI-Grad | NMOT / MMOT | Vx(N_AB) / ax | QBS(ay) / N_VA,N_VI / N_HA,N_HI | EG / KD / FBR | ϑMOT / ϑTransmission / Speed Control System / ASR-Passive Switch | Consequence |
|---|---|---|---|---|---|---|---|
| | | | | | | | Evaluation Number (BZ) |
| Driver Behavior | S S S M M M B B B B | | S M B S M B S M B B | | | | S S M S M B M B B B |
| Environment | B | M M | | | | | B |
| Driving State | B | B | | | | | B |

FIG. 4

| DKI / DKI-Grad | NMOT / MMOT | Vx(N_AB) / ax | QBS(ay) / N_VA,N_VI / N_HA,N_HI | EG / KD / FBR | ϑMOT / ϑTransmission | Speed Control Status | ASR-Passive | Slip λ | Ascent / Descent | Consequence |
|---|---|---|---|---|---|---|---|---|---|---|
|  |  | B | K | Gear max |  | on |  |  | Ge | Suppress Upshift (HSU) |
| B | B |  | K | Gear min |  |  |  | B |  | Suppress Downshift (RSU) |
|  |  | B |  | <4 |  |  |  |  |  | Recommend Upshift (HSE) |
|  |  | S |  |  | on | on |  |  | st | Recommend Downshift (RSE) |
|  |  |  | G | G |  |  |  |  |  | Without Switchover (OUM) |
| S |  | S |  |  |  |  |  |  |  | Gear * (X=2) (GKH) |

G = Suitable

| SB<br>WG-EG | HSU | RSU | HSE | RSE | OUM | GKH |
|---|---|---|---|---|---|---|
| 0<br>Without<br>Switchover | WG<br>=EG | WG<br>=EG | EG+1 | EG−1 | WG<br>=EG | GN<br>(Gear N) |
| >0<br>(HS) | EG | WG | WG | EG<br>or<br>EG−1 | EG | GN |
| <0<br>(RS') | WG | EG | EG<br>or<br>EG+1 | WG | EG | GN |

SYSTEM FOR DETERMINING A GEAR RATIO CHANGE IN AN AUTOMATIC TRANSMISSION

FIELD OF THE INVENTION

The invention relates to a system for determining gear ratio changes for an automatic transmission.

BACKGROUND OF THE INVENTION

For conventional transmission controls, the gear ratio changes are determined by means of a shifting characteristic line from the actual vehicle straight-line speed and the actual accelerator pedal position or throttle flap position. This determination of the shifting characteristic line of an automatic transmission control is purposeful in the normal case but can lead to unwanted shifting in special driving and environmental situations. Such special situations can, for example, be caused by the different types of drivers and/or by different driving or environmental situations to which the vehicle is subjected. As soon as additional criteria for detecting such cases are applied, in addition to the throttle flap position and vehicle straight-line speed, further degrees of freedom result for optimizing the gear ratio of the automatic transmission in the form of adaptive control.

Such systems for adaptive transmission control are, for example, disclosed in the following: U.S. Pat. Nos. 5,025,684 and 5,157,609; an article of A. Welter et al entitled "Die Adaptive Getriebesteuerung für die Automatikgetriebe der BMW Fahrzeuge mit Zwölfzylindermotor" published in ATZ, no. 94 (1992) 9, starting at page 428; and, the article of A. Welter et al entitled "Die Adaptive Getriebesteuerung für BMW-Automobile" published in ATZ, no. 95 (1993) 9, starting at page 420. These articles describe the selection of different shifting characteristic lines in dependance upon recognized types of driver and/or in dependance upon various driving and environmental situations. In addition to the accelerator pedal or throttle flap position, the following are especially also detected: the vehicle straight-line speed (that is, the speed of the vehicle in the forward direction of movement of the vehicle), the vehicle transverse acceleration, the vehicle straight-line acceleration, the vehicle straight-line deceleration and the engine rpm. These quantities are assembled via a number of characteristic fields and/or logic functions to form a characteristic variable. In this way, the driving activity or the driving and environmental situations are determined, if required, by means of filtering. These then function to select a shifting program from a plurality of shifting programs which lie between a shifting program optimized for consumption and a shifting program optimized for power.

With such controls, the switching characteristic of an electrically hydraulically controlled automatic shifting transmission can be continuously adapted to the driving style of the driver or to a traffic situation which is just then present. The complexity for a plurality of characteristic fields or logic functions (for example, for obtaining the driving activity and/or driving situation) and a plurality of shifting programs is very great. It is known to utilize simple evaluation methods or fuzzy logic to reduce the complexity for determining a driving-activity related variable. In such systems, the problem which results from the plurality of different shifting programs remains.

SUMMARY OF THE INVENTION

It is an object of the invention to provide a system for controlling the gear ratio changes for an automatic transmission wherein gear ratio changes which meet demand are achieved with the least possible complexity.

The invention proceeds from a system for determining the gear ratio changes for an automatic transmission wherein means for determining the gear ratio changes of the automatic transmission are provided by means of at least one basic field. The following are supplied to the basic field as input variables: at least the detected position of the accelerator pedal actuated by the driver of the vehicle or variables associated therewith; the detected vehicle straight-line speed and/or the detected transmission output rpm and/or the detected engine rpm or variables associated therewith. Furthermore, means for determining at least a first adaptation variable in dependence upon the instantaneous driving style of the driver and/or on the environmental conditions to which the vehicle is subjected and/or from the driving situation in which the motor vehicle is just then in.

The essence of the invention comprises that means for changing at least one of the input variables of the basic characteristic field are provided. This change takes place in dependence upon the first adaptation variable.

The advantages of the invention are seen in that a system for controlling an automatically shifting transmission is provided. This system, proceeding from a basic shifting program (preferably one for optimal consumption) is adapted dynamically to the driving style and the driving or traffic situation which is just then present without it being necessary to actuate additional operator-controlled elements. Especially, the storage of several shifting characteristic lines or a complicated shift of the characteristic lines is avoided. The storage of a single basic characteristic field (basic shifting program) affords a high measure of inherent reliability compared to freely-adapted shifting characteristic lines. A jump-like adaptation by selection of discrete shifting programs, as in the state of the art, is avoided because the adaptation of the input variables of the basic shifting characteristic field takes place continuously.

In an advantageous embodiment of the invention, means for forming a modified gear ratio change in dependence upon a second adaptation variable is provided in such a manner that especially the specific gear ratio change is reversed with respect to its operational direction (that is, instead of a gear ratio change for an upshift, a gear ratio change for a downshift and vice versa). The background of this configuration of the invention is that the obtained gear ratio changes can be changed based on higher-order criteria. The idea of this configuration is the coupling of a special handling with a purpose of monitoring the determined gear ratio change is provided. This monitoring has a higher priority than the gear ratio change which comes about because of the change of the input variables of the basic shifting characteristic field.

With a reversal of the operational direction, it is intended that when a transition to a greater gear ratio is required by means of the basic shifting characteristic field, a lower gear ratio is adjusted via a special handling. Furthermore, it can be provided that gear ratio changes to higher or lower gear ratio is suppressed or delayed.

In a further advantageous embodiment of the invention, means for determining the second adaptation variable is provided in dependence upon: the environmental conditions to which the vehicle is subjected and/or from the driving situation in which the vehicle is in. This configuration affords the advantage that the above-mentioned special handling with high priority is orientated to the driving situation and/or traffic situation; whereas, the gear ratio change determined by the change of the input variables is also orientated to the driving style of the driver. The special handling with higher priority therefore reverses the operational direction of the gear ratio change; that is, avoids or delays the gear ratio change only then when the particular driving or environmental situation requires this.

A further advantageous embodiment of the invention provides that the first adaptation variable and/or the second adaptation variable are determined by means of a fuzzy module. The use of the known fuzzy technology for obtaining the first and/or second adaptation variable affords the advantages that:

(a) no characteristic field for the on-line computation or only one characteristic field for the off-line computation is necessary;

(b) the rules are qualitative and therefore simpler to formulate;

(c) a smoother course of the result is made possible and the fuzzy evaluation is reliable because of the input of priorities; and, (d) the processing with standardized variables can be transferred to other vehicle types and therefore only adaptations to the characteristics specific to the vehicle are necessary.

It can be especially provided that the first and the second adaptation variables are determined in different fuzzy modules. The modular configuration affords the advantage that the different modules are separately designed or supplemented.

In a further embodiment, the means for changing at least one of the input variables are so configured that this change is only then made when the first adaptation variable deviates from a pregiven value in a specific manner. It is especially here provided that the change of the input variables is only then made when the difference between the first adaptation variable and the pregiven value exceeds a pregiven threshold value. This pregiven value can lie, in an advantageous manner, in the range of the mean value of the maximum value and of the minimum value of the first adaptation variable. These configurations afford the advantage that an adaptation only then takes place when it is actually required. That is, the change of the input variables of the basic characteristic field are only then modified when the driving activity, the driving situation or environmental situation differs in a sufficient manner from a normal operation pregiven by the basic shifting characteristic field.

In a further embodiment of the invention, the means for changing at least one of the input variables is configured so that the extent of the change is dependent upon the actual gear ratio, which is realized from the automatic transmission, and/or in dependence upon the extent of the deviation of the first adaptation variable from the pregiven value described above. This embodiment affords the advantage that the gear ratio changes are adapted to the most different driving activities or driving situations.

The system, according to the invention, can be utilized with automatic transmissions having several discrete adjustable gear ratios as well as for continuously adjustable transmissions.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
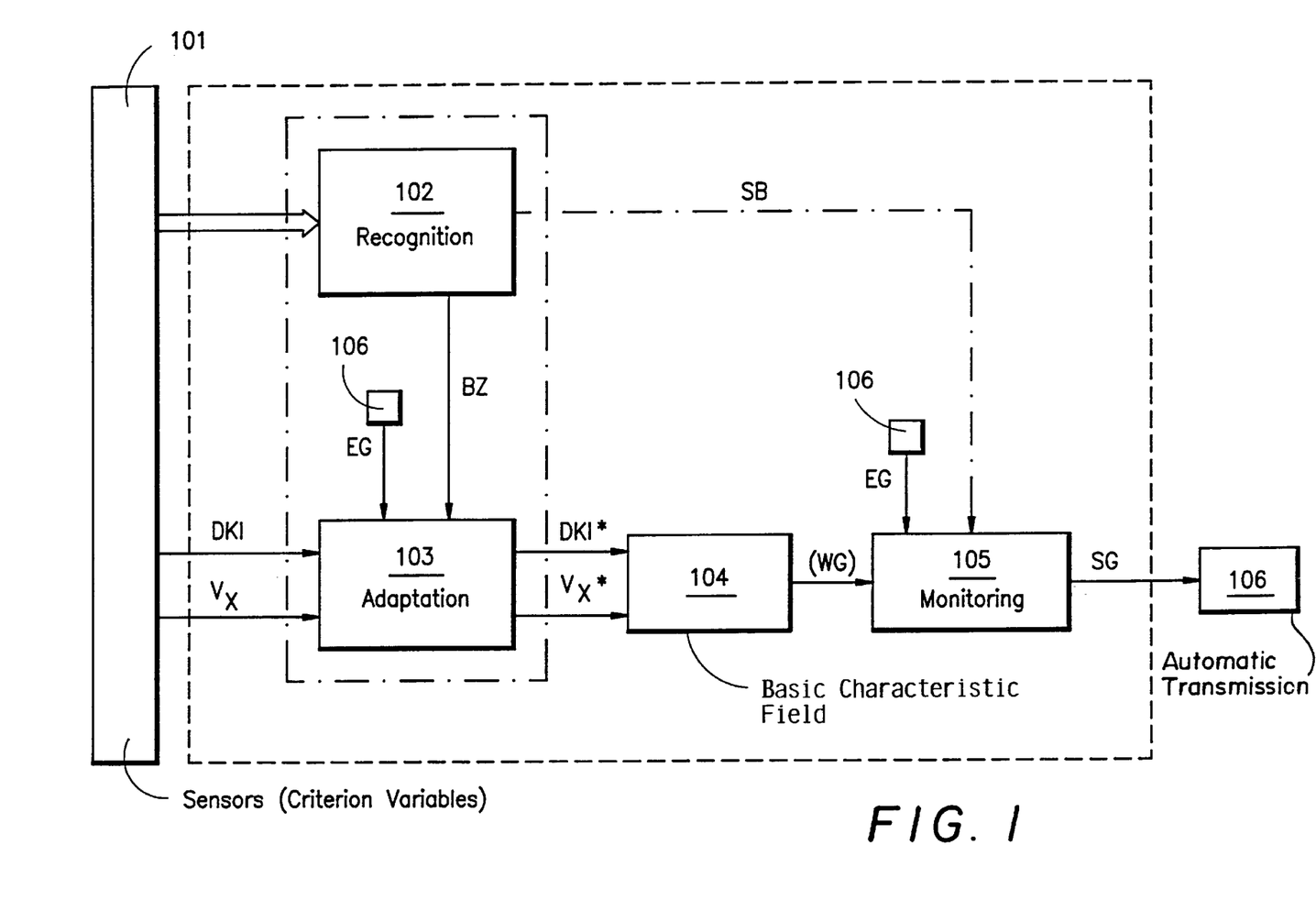
FIG. 1 is a block diagram schematically showing the structure of the adaptive transmission control.
Figure 2A:
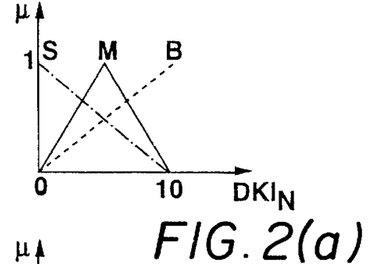
FIG. 2 shows the membership functions which correspond to the block diagram of FIG. 1.
Figure 2B:
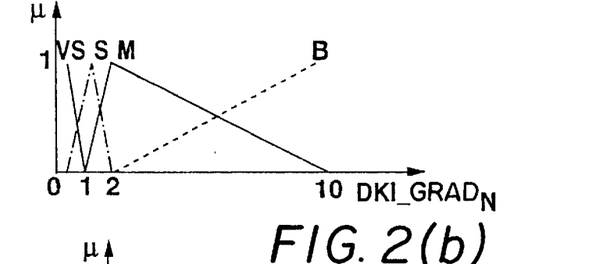
Figures 2C, 2D, 2E:
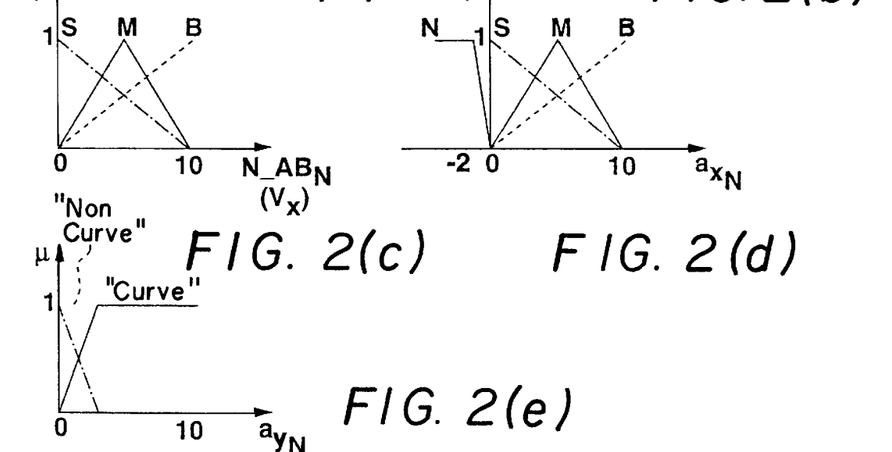
Figures 2F, 2G:
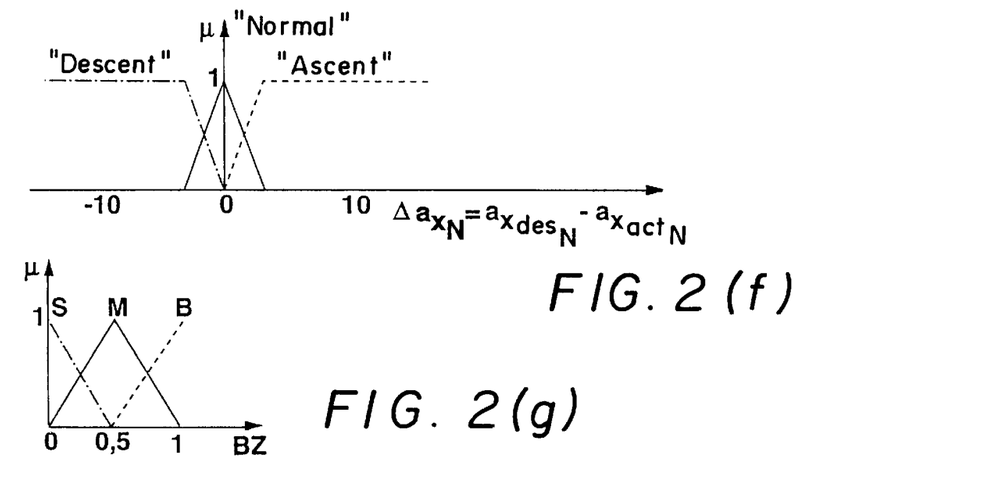

FIG. 1 shows schematically the structure of an embodiment of the adaptive transmission control according to the invention. A suitable desired gear SG (that is, a suitable desired gear ratio) is transmitted to the automatic transmission 106 from the evaluation of the sensor variable detected by the sensor 101. The adaptive transmission control is comprised essentially of four parts, namely: basic characteristic field 104, detection 102, adaptation 103 and monitoring 105. Two types of outputs are determined in detection 102 proceeding from the sensor variables:

(1) evaluation of the instantaneous driving style, the environment and the driving state in the form of an evaluation number BZ; and, (2) a special treatment variable SB.

The evaluation number BZ operates to modify the characteristic line of a base characteristic field 104 with the aid of an adaptation mechanism (in dependence upon the throttle flap position DKI, the vehicle speed $V_x$ and the engaged gear EG). The command gear determined therefrom or, more specifically, the command gear ratio WG is monitored with the aid of the signals EG (the then engaged gear or gear ratio) and the special handling variable SB before this gear is outputted as the desired gear or gear ratio SG to the automatic transmission 106.

1. Criterion Formation (Sensors 101)

For the recognition 102, criterion variables must be formed from the sensor signals (sensors 101). The following criterion variables can, for example, be used:

throttle flap position DKI
change of DKI DKI_Grad (derived from DKI)
motor rpm NMOT
motor torque MMOT
wheel rpm N_VA, N_VI, V_HA, N_HI
driving speed $V_x$ (or transmission output rpm N_AB)
longitudinal acceleration $a_x$ (derived from $V_x$)
transverse acceleration $a_y$ (from wheel rpm N_VA, N_VI, N_HA, N_HI)
steering angle δ
slip λ (from ABS system/ASR system)
upward/downward slope "St"/ "Ge" (from vehicle model, for example, by comparing a desired acceleration to a actual acceleration)
motor temperature $T_{MOT}$
transmission temperature $T_{transmission}$
engaged gear EG
kickdown switch KD
brake signal FBR (actuation of the brake)
turbine rpm NTU
turbine torque MTU (derived from NTU, characteristic field)

drive torque MANTR (derived from MMOT)
rotational torque MROT (derived from NTU)
position switch Position PRND434 (manual)
speed-control status on/off
ASR-passive on/off
switch
switching command Tip +/−
program switch (manual)

2. Recognition 102

For recognition 102, the methods of fuzzy logic known from the state of the art are used. For this purpose, two different fuzzy modules for determining the evaluation number BZ and for determining the special handling SB have been developed.

2.1 Determination of Evaluation Number BZ

The result of the first fuzzy module is the evaluation number BZ which lies between 0 and 1. The following have been established:

|               | 0                    | 1                    |
| ------------- | -------------------- | -------------------- |
| Driving style | very economical      | very sporty          |
| Environment   | steep downhill       | steep uphill         |
|               | straight-line driving| very curvy streets   |
|               | wet road surface     | dry road surface     |
| vehicle       | only slightly loaded | heavily loaded (trailer) |
| driving state | no driving resistance| great driving resistance |

For determining the evaluation number BZ, the following steps are carried out:

(a) Fuzzification

The criterion variables and the evaluation number BZ are standardized and are defined as fuzzy variables (for example, S (small), M (medium), B (large). Triangular functions or trapezoidal functions for the membership functions are selected. This can be seen in FIG. 2 which is exemplary. The normalizing or standardizing range can be freely selected. The processing with normalized variables is advantageous for the implementation because of the transferability to different vehicle types.

(b) Control basis

Figure 3:
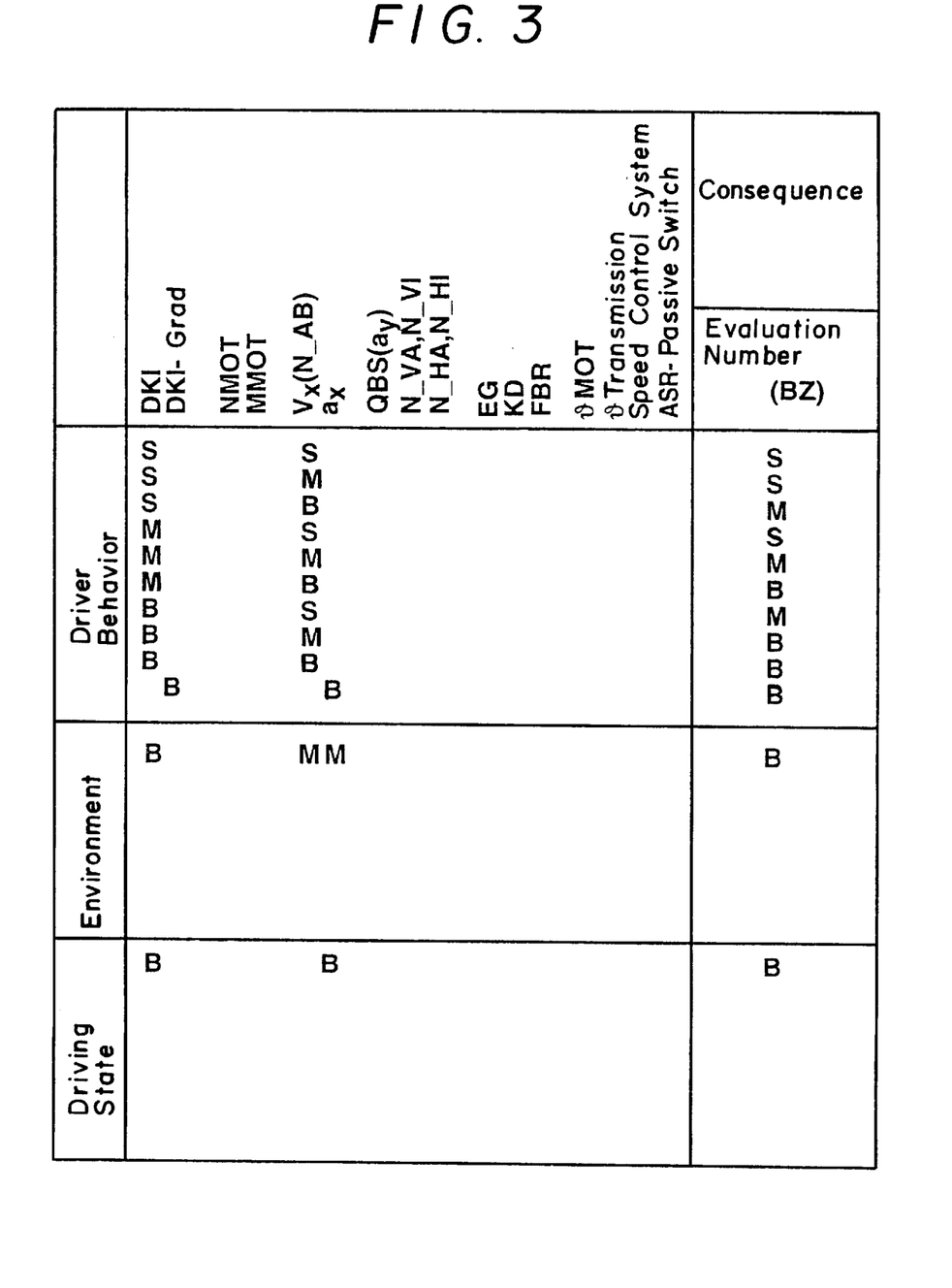
FIG. 3 is a table showing the control basis for determining the evaluation number.

In the control basis shown in FIG. 3, the controls are assembled in groups but are evaluated in common. The groups are: driving style, environment, driving state and other.

The rules are obtained by putting questionnaires to experts or empirically.

(c) Inference/Defuzzification

The above-mentioned rules are evaluated and summarized (inference). The result of the inference is given by a resulting fuzzy quantity (conclusion). From this uncertain quantity, a specific quantity is computed (defuzzification). The simplified Max-Dot-COA-method is used as an evaluation method, for example.

The following literature is pertinent:

(a) article by C. C. Lee entitled "Fuzzy Logic in Control Systems: Fuzzy Logic Controller-Part I and Part II", IEEE Transactions on Systems, Man and Cybernetics, Vol. 20, no. 2, 1990, pages 404–435; and, (b) TILShell User's Manual, page 295, Togai IfraLogic, Inc., California, USA, 1988–1993. Version 3.0.0.

In this way, an evaluation number BZ is obtained which lies in this embodiment between the value 0 and the value 1.

2.2 Special Treatment

For situations wherein a controlled adaptation via a evaluation number BZ is no longer adequate and/or an action (gear ratio change) must be immediately initiated. A special handling takes place which is represented by the special handling variable SB.

The special handling can then be one of the following decisions:

(a) suppress upshifting (HSU);
(b) suppression of downshifting (RSU);
(c) recommend upshifting (HSE);
(d) recommend downshifting (RSE);
(e) without switchover (OUM);
(f) maintain constant at a specific gear GN (GKH).

Figure 4:
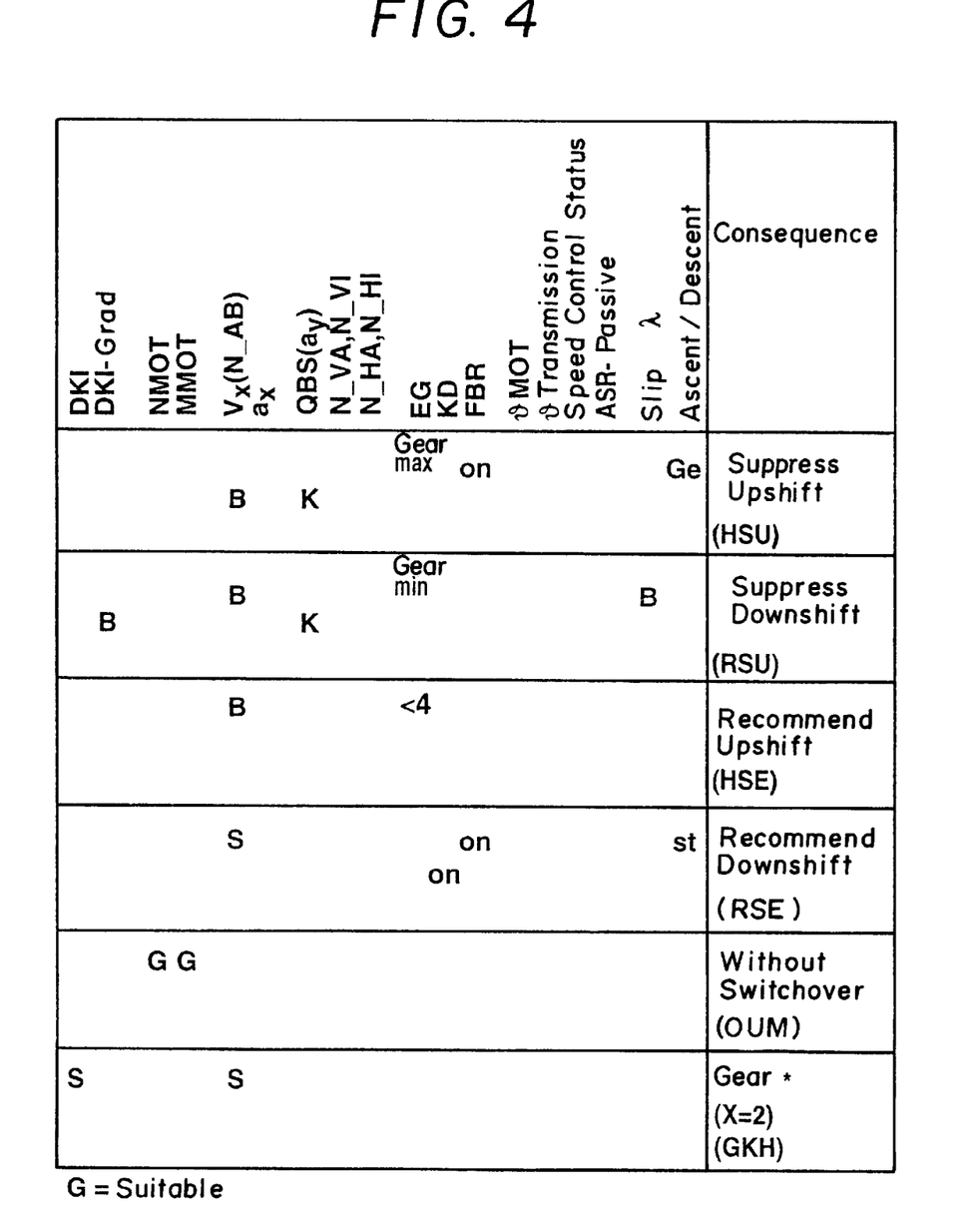
FIG. 4 is a table showing the control basis for special handling.

The formation of the special handling variable SB takes place in a manner similar to the formation of the evaluation number BZ with the aid of a fuzzy module. The rules for the special handling are shown in FIG. 4. These rules are, in turn, based upon expert knowledge. In contrast to the evaluation number BZ, the special handling variable SB has the role of a monitor and therefore has a higher priority.

3. Gear Selection Appropriate to Situation

3.1 Basic Characteristic Field 104

The basis of the gear selection is a basic characteristic field 104 having the vehicle straight-line speed $V_x$ and the throttle flap position DKI as input variables and the command gear or the command gear ratio WG as the output variable. By agreement, this basic characteristic field 104 has evaluation number $BZ_0$ of 0.5. The characteristic lines of the basic characteristic field 104 can be adapted in dependence upon the continuously determined evaluation number BZ.

3.2 Adaptation 103

Figure 5:
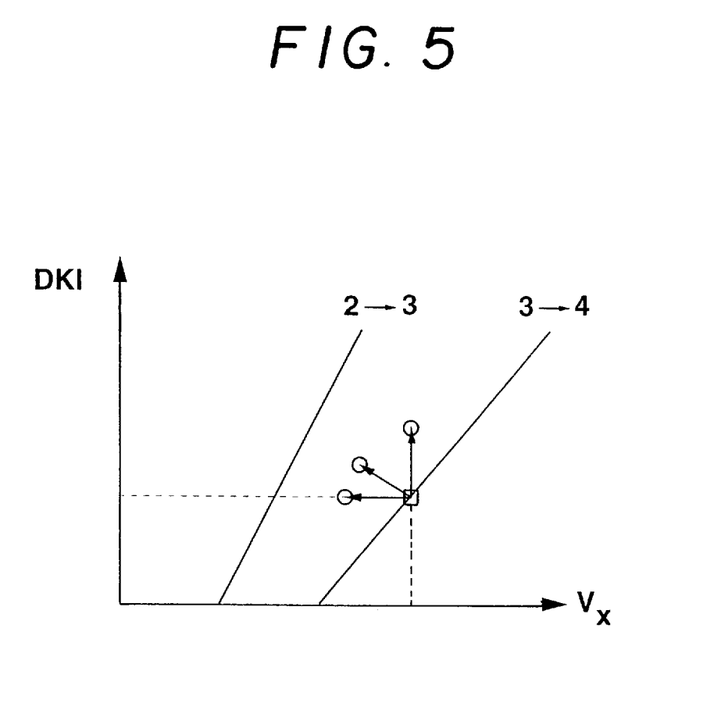
FIG. 5 is a graph showing the adaptation by changing the input variables of the basic characteristic field.

This adaptation takes place in such a manner that, in lieu of a displacement of the characteristic line, a refined mapping of the coordinates of the characteristic field is undertaken. This is seen in FIG. 5. For this purpose, the input variables of the basic characteristic field 104, namely, DKI and/or $V_x$ are modified to the variables $DKI^*$ and/or $V_x^*$. The following table shows how delays of shifting and accelerations of shifting are obtained from the foregoing.

|                       | $V_x$                                 | DKI                              |
| --------------------- | ------------------------------------- | -------------------------------- |
| delay upshifting      | $V_x^* < V_x$ (displace to the left)  | $DKI^* > DKI$ (displace upwardly) |
| accelerate upshifting | $V_x^* > V_x$ (displace to the right) | $DKI^* < DKI$ (displace downwardly) |
| delay downshifting    | $V_x^* > V_x$ (displace to the right) | $DKI^* < DKI$ (displace downwardly) |
| accelerate downshifting | $V_x^* < V_x$ (displace to the left) | $DKI^* > SKI$ (displace upwardly) |

The input variables of the basic characteristic field 104, namely, DKI and/or $V_x$, are modified to the variables $DKI^*$ and/or $V_x^*$ in the following manner:

$$DKI^* = f(DKI, V_x, \Delta BZ, EG)$$

$$V_x^* = f(DKI, V_x, \Delta BZ, EG)$$

$$\Delta BZ = BZ - BZ_0.$$

One special case of the solution is:

$$DKI^* = a_1 \cdot DKI + b_1$$

$$V_x^* = a_2 \cdot V_x + b_2$$

The parameters ($a_1$, $b_1$, $a_2$, $b_2$) are dependent upon:
the engaged gear or the instantaneous gear ratio EG; and,
the difference of the evaluation number $\Delta BZ = BZ - BZ_0$
and are selected as follows:

(a) when $\Delta BZ$ is positive, then DKI ($V_x$) are artificially increased or (reduced). In this case, an upshift is delayed; and, (b) when $\Delta BZ$ is negative, then DKI ($V_x$) is artificially reduced (increased). In this case, an upshift is accelerated.

Figure 6:
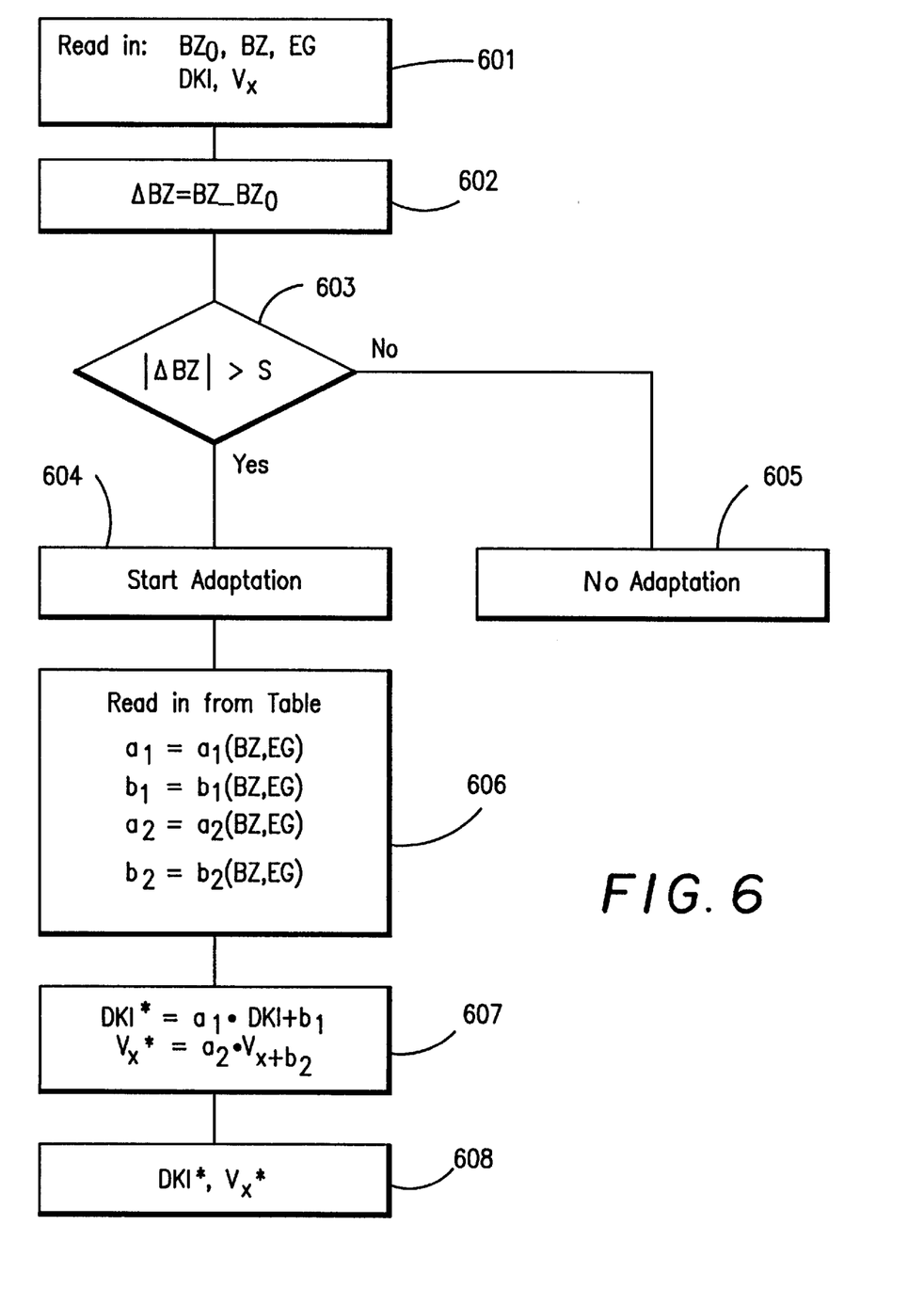
FIG. 6 is a flow-chart showing the step-by-step course of the adaptation.

The flowchart in FIG. 6 shows the course of the adaptation. In the first step 601, the following are read-in: the actually determined evaluation number BZ, the actually engaged gear EG, the actual throttle flap position DKI and the instantaneous vehicle straight-line speed $V_x$ as well as the evaluation number $BZ_0$ of the basic characteristic field. In step 602, $\Delta BZ$ is determined as the difference of the actually determined evaluation number BZ and the reference number $BZ_0$ assigned to the basic characteristic field. In step 603, the amount of the difference determined in step 602 is compared to a threshold value S. This threshold value can be permanently selected or can be dependent from the driving state of the vehicle and/or on variables which influence the driving state of the vehicle. If the difference determined in step 602 lies below the threshold S, then no adaptation of the input variables of the basic characteristic field 104 take place in step 605.

However, if the difference determined in step 602 exceeds the threshold value S, then the adaptation begins with the step 604. For this purpose, in step 606, the values $a_1$, $b_1$, $a_2$ and $b_2$ described supra are first read in from the table. These values represent the extent of the change of the input variables and are determined as functions of the actually determined evaluation number BZ and the instantaneously engaged gear EG. As mentioned, this can be stored as a table.

In the following step 607, the input variables DKI and $V_x$ of the basic characteristic field are changed with the parameters read-in in step 606. In step 608, the input variables $DKI^*$ and $V_x^*$, changed in this way, are outputted to the basic characteristic field 104.

In this way, a command gear WG is produced as the output signal of the basic characteristic field 104 which has been adapted during travel of the vehicle to the individual driving style, the environmental condition and the concrete driving situation.

3.3 Monitoring

With the monitoring 105, the determined command gear WG is monitored in dependence upon the special handling signal SB in comparison to the instantaneous engaged gear EG. The results of this monitoring are summarized in FIG. 7. This will be explained in the context of an example.

Figure 7:
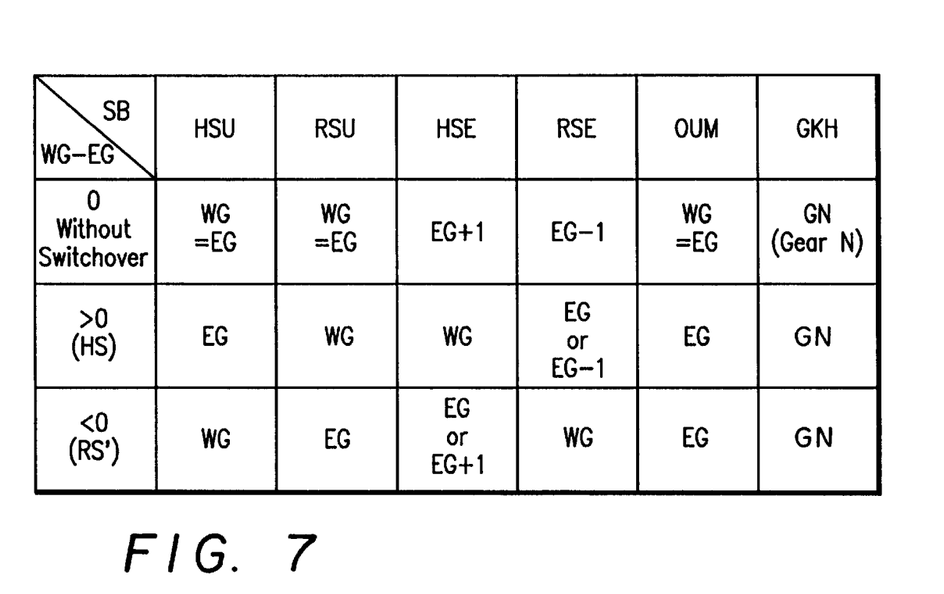
FIG. 7 is a table for monitoring the command gear with the desired gear that results; and, FIG. 8 is a flow-chart showing the test of the desired gear as to physical limits.

It is assumed that the instantaneously engaged gear is the second gear (EG=2) and the command gear is the third gear (WG=3). Without the monitoring 105, an upshift operation would be triggered in the automatic transmission 106. With the monitoring 105, the command gear WG (upshift) can lead to maintaining the engaged gear or even to a downshift operation (EG−1) via the corresponding special treatment signal SB=RSE (downshift recommended). One such forced downshift can, for example, be then necessary when an upshift operation is indicated by means of the evaluation number and the basic characteristic field; but, a sudden press down of the accelerator pedal defines an acceleration command and brings an immediate downshift command to the fore.

Figure 8:
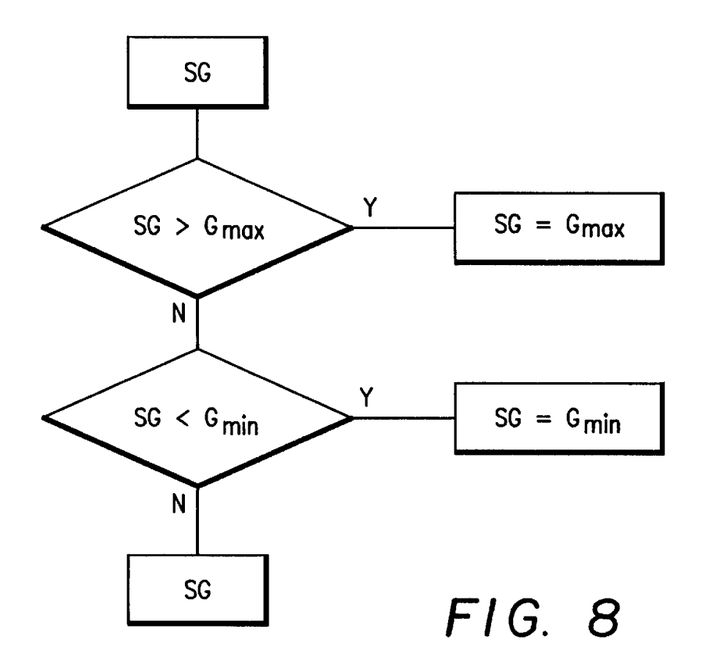

The command gear WG, which is modified in the monitoring 105, is transmitted as the desired gear SG to the automatic transmission 106 after this desired gear SG has been checked as to maintaining the physical limits ($G_{max}$, $G_{min}$). This is shown in FIG. 8.

In the embodiment described, a step-wise adjustable automatic transmission is described and therefore, various gear stages. The invention is, however, also applicable to the adaptive control of a transmission continuously adjustable with respect to its gear ratio. Then a command gear or a desired gear is not determined as described above; instead, a command gear ratio or a desired gear ratio is determined.

It is understood that the foregoing description is that of the preferred embodiments of the invention and that various changes and modifications may be made thereto without departing from the spirit and scope of the invention as defined in the appended claims.

What is claimed is:

1. A system for determining a gear ratio change in an automatic transmission in a vehicle having an accelerator pedal actuated by a driver of the vehicle, the system comprising:

first sensor means for detecting the position (DK) of said accelerator pedal as a first variable;

second sensor means for detecting the straight-line speed ($V_x$) of said vehicle as a second variable;

recognition means for determining an adaptation variable (BZ) in dependence upon at least one of the following: the instantaneous driving behavior of the driver, the environmental conditions to which the vehicle is subjected and the driving situation in which the vehicle is;

gear ratio change means for determining the gear ratio change in said automatic transmission and said gear ratio change means including a basic characteristic field;

adaptation means for receiving said first and second variables (DK, $V_x$) as first and second input variables (DK, $V_x$) and for changing at least one of said first and second input variables (DK, $V_x$) in dependence upon said adaptation variable (BZ) to form at least one changed input variable ($DK^*$ and/or $V_x^*$) and then outputting said changed input variable ($DK^*$ and/or $V_x^*$) to said basic characteristic field of said gear ratio change means; and, said gear ratio change means being adapted to utilize said basis characteristic field to determine said gear ratio change in dependence upon said at least one input variable ($DK^*$ and/or $V_x^*$) changed in dependence upon said adaptation variable (BZ).

2. The system of claim 1, said gear ratio change being an unmodified gear ratio change (WG); said adaptation variable (BZ) being a first adaptation variable (BZ); said recognition means being adapted to determine a second adaptation variable (SB); and, said system further comprising means for modifying said unmodified gear ratio change (WG) to form a modified gear ratio change (SG) in dependence upon said second adaptation variable (SB).

3. The system of claim 2, wherein said unmodified gear ratio change (WG) is changed with respect to its operational direction (increased/reduced gear ratios).

4. The system of claim 3, said recognition means for determining said second adaptation variable (SB) in dependence upon environmental conditions to which said vehicle is subjected and/or the driving situation in which said vehicle is.

5. The system of claim 4, wherein at least one of said first adaptation variable (BZ) and said second adaptation variable (SB) is determined with a fuzzy module.

6. The system of claim 5, said adaptation means being configured so as to cause the change of said at least one of said first and second input variables (DK, $V_x$) to take place only when said first adaptation variable (BZ) deviates from a pregiven value ($BZ_0$) in a specific manner.

7. The system of claim 6, said adaptation means being configured so as to cause the change of at least one of said first and second input variables (DK, $V_x$) to take place only when the difference between said first adaptation variable (BZ) and said pregiven value ($BZ_0$) exceeds a pregiven threshold value (S).

8. The system of claim 7, wherein said pregiven value ($BZ_0$) lies in a range of the mean value of the maximum value (1) and of the minimum value (0) of said first adaptation variable (BZ).

9. The system of claim 1, said adaptation means being configured so as to cause the extent of the change of said first and second input variables (DK, $V_x$) to be dependent from the actual gear ratio (EG) and/or to be dependent from the extent ($\Delta BZ = BZ - BZ_0$) of the deviation of said first adaptation variable (BZ) from a pregiven value ($BZ_0$).

10. The system of claim 2, further comprising means for comparing said unmodified gear ratio change (WG) or said modified gear ratio change (SG) to maximum and/or minimum threshold values ($G_{min}$, $G_{max}$) and for issuing a shift command to said automatic transmission in dependence upon this comparison.

11. The system of claim 1, wherein said automatic transmission has several discretely adjustable gear ratios or wherein the gear ratio change is continuously adjustable.

* * * * *

UNITED STATES PATENT AND TRADEMARK OFFICE
CERTIFICATE OF CORRECTION

PATENT NO. : 5,857,161
DATED : January 5, 1999
INVENTOR(S) : Bernhard Zeilinger, Chi-Thuan Cao and Marko Poljansek It is certified that error appears in the above-identified patent and that said Letters Patent is hereby corrected as shown below:

In column 3, line 43: delete "are" and substitute -- is -- therefor.

In column 5, line 65: delete "TILShell" and substitute -- TILshell --.

In column 6, line 61: delete "SKI" and substitute -- DKI -- therefor.

In column 7, line 1: delete "DKI =" and substitute -- DKI* = -- therefor.

In column 7, line 16: delete "or".

In column 7, line 37: delete "take" and substitute -- takes -- therefor.

In column 8, line 58: delete "basis" and substitute -- basic -- therefor.

Signed and Sealed this

Eighth Day of May, 2001

Attest:

NICHOLAS P. GODICI

Attesting Officer     Acting Director of the United States Patent and Trademark Office